United States Patent [19]

Uno et al.

[11] Patent Number: 4,571,461
[45] Date of Patent: Feb. 18, 1986

[54] CONFERENCE TELEPHONE APPARATUS

[75] Inventors: Kinichi Uno; Tohru Nakahara, both of Tokyo, Japan

[73] Assignee: NEC Corporation, Tokyo, Japan

[21] Appl. No.: 600,463

[22] Filed: Apr. 16, 1984

[30] Foreign Application Priority Data

Apr. 18, 1983 [JP] Japan .................................. 58-68003

[51] Int. Cl.⁴ ........................................... H04M 1/60
[52] U.S. Cl. ................................................. 179/81 B
[58] Field of Search .............. 179/18 BC, 81 B, 100 L

[56] References Cited

U.S. PATENT DOCUMENTS

3,970,786 7/1976 Randmere ........................ 179/81 B
4,465,902 8/1984 Zato ............................. 179/81 B X
4,490,582 12/1984 Munson ............................ 179/81 B Primary Examiner—James L. Dwyer
Attorney, Agent, or Firm—Laff, Whitesel, Conte & Saret

[57] ABSTRACT

The invention provides a circuit for preventing howling responsive to an acoustic feedback between a microphone and a loudspeaker in a hands free telephone or the like. Both a transmit path and a receive path include a variable loss circuit and a level detector circuit which compares the level of a signal picked-up by a microphone with a level of a signal received from another party. Responsive to the comparison, a normal gain is set in one of the communication paths at a level which is higher than the signal level in the path. A loss is inserted in the other communication path. A control circuit compares outputs of the level detector circuits to control the losses of the variable loss circuits. To measure a loss due to the acoustic coupling and to measure a reverberation time, a manual switch is operated to drive a microprocessor type control circuit responsive to an in-band noise which produces a voice-band noise signal from the loudspeaker. The acoustic coupling loss and reverberation time are found by computation and then stored. Signals transmitted and received during conversation are processed to control the variable loss circuits of the communication paths, on a basis of stored signal levels.

15 Claims, 11 Drawing Figures

CONFERENCE TELEPHONE APPARATUS

BACKGROUND OF THE INVENTION

The present invention relates to an improvement in a conference telephone apparatus which includes a microphone and a loudspeaker and which has a voice switching circuit for eliminating howling.

More particularly, the present invention is concerned with a conference telephone apparatus which allows persons in a room to hold hands-free, mutual conversations in a conference call with persons in a remote room by means of microphones and loudspeakers. The two remote rooms are interconnected by a communication line.

In a hands-free conference telephone system of the type described, a voice switching circuit prevents howling from developing due to acoustic coupling between a microphone and a loudspeaker. The voice switching circuit compares the level of a transmitted speech signal picked up by the microphone with the level of a received speech signal sent from the other party. The switching circuit removes a loss from a communication channel associated with the one of the speech signals which has a level that is higher than the level in another channel. This removal of a loss sets up a normal gain (gain of an amplifier circuit necessary for ordinary communications), while simultaneously inserting a loss in a communication channel associated with the channel having a lower speech signal level. A comparator cicuit included in the voice switching circuit has rectified and smoothed versions of the transmitted and received signals.

The charging and discharging time constants of a rectifying and smoothing circuit have heretofore been predetermined with the following principle. It is essential that the buildup time of the voice switch be as short as possible in order to clip to a minimum the number of initial syllables of a speech signal which is to be interrupted. Hence, the charging time constant simply needs to be short. The discharging time constant, on the other hand, should be based on a relationship between the characteristics which prevent clipping the last syllables of a speech signal which is being interrupted and the changeover characteristics of the voice switching circuit from a transmitting state to a receiving state, and vice versa, during mutual communication with the other party, i.e. speech exchangeability. However, it has been a common practice to select a fixed discharging time constant at the sacrifice of speech exchangeability on the assumption that a reverberation time in a conference room is generally 0.5-0.6 second, so that the voice switch may be prevented from being erroneously changed from the receiving state to the transmitting state in response to a received speech signal which represents a voice signal which was amplified by a loudspeaker and picked up by a microphone.

In another known system, a level control is performed such that a predetermined loss or a predetermined gain is applied, for a given period of time, to a transmitting signal level and a receiving signal level which re fed to the comparator circuit, depending upon the state of the voice switch, so as to stably maintain the then existing condition of the voice switch.

In short, prior art conference telephone systems, with voice switching circuits, are commonly constructed with fixed parameters which only match assumed ranges of reverberation time in rooms and acoustic coupling between microphones and loudspeakers. This brings about a severe situation even when actual acoustic conditions in a room are better than the presumed ones. No improvement is attainable in speech exchangeability. Or, when room conditions are worse than the presumed ones, e.g., in a conference room whose reverberation time is longer than 0.6 second, for example, a "received speech blocking" occurs in which a received speech interrupts itself.

SUMMARY OF THE INVENTION

It is, therefore, an object of the present invention to solve the above-discussed problem and to provide a conference telephone system which eliminates howling and received speech blocking regardless of acoustic conditions or sound absorbing conditions, while insuring optimum speech exchangeability.

A conference telephone apparatus, in accordance with the present invention, is of the type having a transmit communication path and a receive communication path. Each path includes a variable loss circuit and a level detector circuit. The detector circuit detects the level of a transmitted signal picked up by a microphone and a level of a transmitted signal sent from the other party's conference room, respectively. A control circuit compares outputs of the level detector circuits. Responsive to the comparison, a normal gain is set in one of the communication paths which is higher in signal level than the gain in the other path. A loss is inserted in the other communication path. The control circuit controls the losses of the variable loss circuits, and thereby prevent howling and echos originating from an acoustic coupling between the microphone and a loudspeaker.

The inventive apparatus has an in-band noise generator circuit, a received signal input switching circuit, and a manual switch. In order to measure a loss due to the acoustic coupling between the loudspeaker and the microphone and to measure a reverberation time which indicates how long a received signal amplified by the loudspeaker is kept echoing in a conference room, the manual switch is operated to drive the control circuit to recognize the measuring operation which is under way. At the same time, the received signal input switching circuit is connected to the in-band noise generator circuit for a predetermined period of time to produce a noise signal from the loudspeaker. This noise occurs intermittently, in a suitable manner, under the control of the control circuit.

The noise signal is then fed to the control circuit, via the level detectors. The control circuit determines an acoustic coupling loss and a reverberation time by computation and then stores the resulting data therein. Upon completion of the measurement, the received signal input switching circuit is returned into its connection with a receive line terminal, to allow conversations to be held. Simultaneously, signals transmitted and received during conversation are processed by the control circuit based on at least one of the signal levels. The processed signals are routed to the control circuit via the level detector circuits. The stored data is indicative of an acoustic coupling loss. A pseudoecho signal is time-serially attenuated with an exponential function and is added to the received signal by processing the signal with respect to the stored reverberation time data. The added signal controls the operation for comparing the level detector outputs at a voice switching circuit to minimize the difference between transmission/reception changeover levels. Concerning the loss control over the variable loss circuits of the communication paths, losses are also selected on the basis of the data representative of an acoustic coupling loss and a reverberation time.

DETAILED DESCRIPTION OF THE PREFERRED EMBODIMENTS

Figure 1:
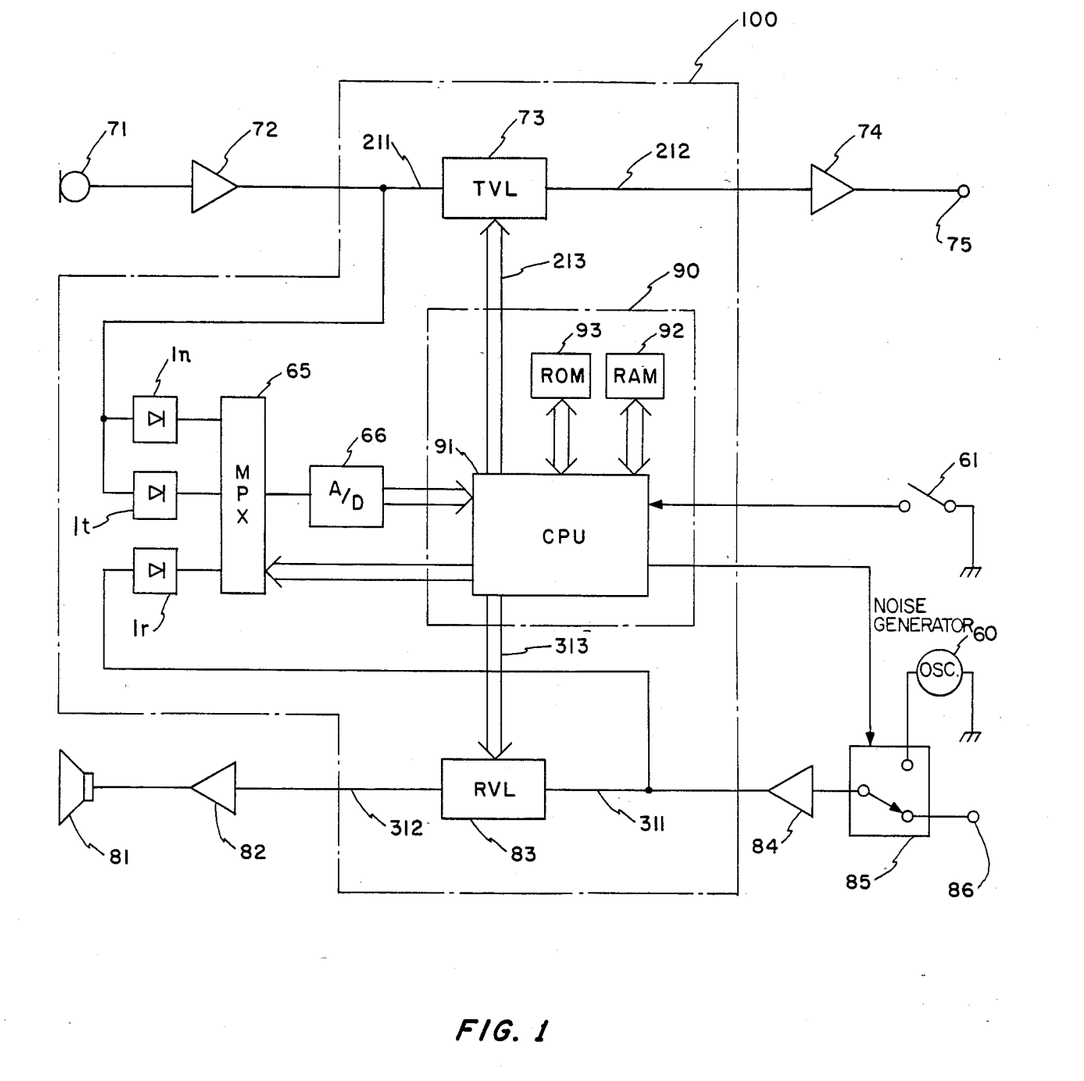
FIG. 1 is a block diagram of a first embodiment of the present invention.

FIG. 1 shows a conference telephone system embodying the present invention which includes a voice switching circuit 100. As shown, the voice switching circuit 100 includes rectifiers 1t and 1r which are adapted to detect an envelope of a speech signal and to convert it into a DC signal. A noise detection circuit 1n detects a room noise level and converts it into a DC signal. The remainder of FIG. 1 comprises multiplexer 65, digital control type variable loss circuits 73 and 83, a log conversion type analog-to-digital (A/D) converter 66, and a control circuit 90 made up of a computer section 91, a random access memory (RAM) 92, and a read only memory (ROM) 93 which stores the program to perform the control.

A transmit communication path comprises a microphone 71, a microphone amplifier 72, a digital control type variable loss circuit (TVL) 73, a transmit communication amplifier 74, and a transmit line terminal 75. A receive communication path, on the other hand, comprises a receive line terminal 86, a received speech signal input switching circuit 85, a receive communication path amplifier 84, a digital control type variable loss circuit (RVL) 83, a loudspeaker amplifier 82, and a loudspeaker 81.

Further, a manual switch 61 is connected to the control circuit 90. An in-band noise generation circuit 60 is connected to the switching circuit 85.

During usual conversations, an analog transmitting signal coming in through the microphone 71 and microphone amplifier 72 is converted by the rectifier 1t into a DC signal which is then routed through the multiplexer 65 to the A/D converter 66. The digital output of the A/D converter 66 is data used by the control circuit 90. Likewise, since the receive line terminal 86 and the receive communication path amplifier 84 are interconnected via the switch 85, a received speech signal is fed through the receive path amplifier 84 to the rectifier 14, to be converted into a DC signal. The output of the rectifier 1r is applied to the multiplexer 65. From there, the A/D converter 66 sends a digital data signal to the control circuit 90.

The control circuit 90, as will be described, performs a comparing and computing processing responsive to the signal levels of the two different data. When it is determined that the level of the transmitted signal is higher than the level of the received signal, the control circuit 90 controls the variable loss circuits 73 and 83 to remove a loss from the transmit path or channel to set up a normal gain, while inserting a loss in the receive path or channel.

As a result, a speech signal picked up by the microphone 71 is passed through the variable loss circuit 73 without any loss, amplified by the transmit path amplifier 74 to a line transmission level, and then caused to appear at the transmit line terminal 75. Meanwhile, when the system is in a tramsmitting condition, a received speech signal is amplified by the receive path amplifier 84 up to a predetermined level, attenuated by the variable loss circuit 83 to a predetermined degree which is designed to eliminate howling, power amplified by the loudspeaker amplifier 82, and then applied to the loudspeaker 81.

Conversely, when the level of the received signal is higher than the signal level of the transmitted signal, the control circuit 90 operates to insert a loss in the transmit variable loss circuit 73 and to remove a loss from the receive variable loss circuit 83 to set up a normal gain. The control discussed above enables conversations to be held in an ordinary amplified manner.

The amount of attenuation by each of the digital control type variable loss circuits 73 and 83, for preventing howling, is predetermined in the following manner. Assume that apparatus identical in construction to the apparatus of FIG. 1 are interconnected by a 4-wire telephone line, and that the loss of the line is zero. Also assume in FIG. 1 that the total gain of the microphone amplifier 72 and transmit path amplifier 74 is $G_t$, the total gain of the receive path amplifier 84 and loudspeaker amplifier 82 is $G_r$, the amount of attenuation effected by the transmit variable loss circuit 83 is $L_t$, and that the attenuation effected by the receive variable loss circuit 73 is $L_r$. Then, a condition for the loop, including the other party's apparatus, to be free from holwing is expressed as:

$$0 \geq 2 \times \{(G_t + G_r) - (L_t + L_r) - \alpha\} \text{(dB)} \tag{1}$$

In the Eq. (1), $\alpha$ is a loss due to acoustic coupling between the loudspeaker 81 and the microphone 71, which is dependent upon the characteristics of the devices themselves such as the efficiency of the loudspeaker, sensitivity and directivity of the microphone, the distance between the loudspeaker and the microphone, the number and arrangement of speakers and microphones, and acoustic conditions inside a room such as wall surfaces, desks, etc. Electrically, these conditions may be represented by an equation:

$$\alpha = P_s - P_m \text{(dB)} \tag{2}$$

where $P_s$ is the power input to the loudspeaker 81 and $P_m$, the power output from the microphone 71.

Eq. (1) teaches that, if the gain $(G_t+G_r)$ is predetermined in the designing stage of the apparatus, the attenuation amount $(L_t+L_r)$ may be decided by knowing the acoustic coupling loss $\alpha$ which is susceptive to the acoustic conditions of a place for use (conference room etc.), i.e. layout of speakers and microphones and acoustic conditions inside a room. However, taking into account possible installation of the apparatus in poor surrounding conditions, it has been customary to assume a relatively small loss and to fix a relatively large attenuation $(L_t+L_r)$, relying on experience only.

In accordance with the present invention, the conference telephone apparatus is furnished with a special function of measuring a reverberation time which indicates how long a received sound pressure amplified by a loudspeaker remains echoing in a conference room. The attenuations by the variable loss circuits may be preselected optimumly for any place and any time while switching over the transmission and reception.

The measurement of the acoustic coupling loss $\alpha$ and reverberation time in a room is effected by operating the manual switch 61. When the manual switch 61 is closed once (step 1 in FIG. 4) the control circuit 90 controls the switching circuit 85 to connect the in-band noise generator 60 to the receive path amplifier 84 (step 3), and inserts a loss having a certain initial value in the receive variable loss circuit 83. Then, the measurement may be performed with a lowest possible noise signal level (step 4). Eventually, the loss is decreased until the noise signal level becomes sufficiently higher than the background noise level, in the room. Concerning the transmit variable loss circuit 73, the control circuit 90 inserts a maximum loss (maximum loss which is attainable with the aforementioned construction of the variable loss circuit) to lower the gain of the transmit path as far as possible (step 2). By such a control, the noise signal output from the in-band noise generator 60 is compressed by the variable loss circuit 83 to a predetermined level, power amplified by the loudspeaker amplifier 82, and then produced from the loudspeaker 81. The amplified noise has all the spectra in the transmit frequency band of the conference telephone apparatus. The noise is picked up by the microphone 71, amplified by the microphone amplifier 72, converted into a DC signal by the rectifier 1t, and passed through the multiplexer 65 to be transmformed by the A/D converter 66 into a digital signal. This digital signal is used by the control circuit 90, as data (step 5). Since the maximum loss has been inserted in the transmit variable loss circuit 73, noise is prevented from leaking into the communication paths.

While the apparatus of the present invention is conditioned for usual conversation levels during a conference, the room background noise is pikced up by the microphone and routed to the backgound noise detector 1n. The background noise detector 1n has a sufficiently large charging time constant and a small discharging time constant in order to discriminate background noise from speech signals which are commonly picked up by the microphone. This serves to remove speech signals and like components whose levels undergo substantial variations and converts only the background noise into a DC signal. The DC signal is fed through the multiplexer 65 to the A/D converter 676 to be transformed into a digital signal which is then used by the control circuit 90 as background noise data N, the digital signal being stores in the RAM 92. Such a data is continuously updated by an instantaneous background noise level.

As the manual switch 61 is operated, an adjustment occurs so that measurement may be effected with a good signal-to-noise (S/N) ratio between the background noise and the in-band noise signal which is used for measuring a reverberation time. That is, the adjustment occurs when the ratio of the transmitting signal level picked up by the microphone 71 to the background noise level data stored in the RAM 92 is smaller than a signal-to-noise ratio which is predetermined to avoid measurement errors. The control circuit 90 causes a reduction of the inserted loss of the receive variable loss circuit 83 until the predetermined S/N ratio is reached. The reduction of the loss increases the level of the in-band noise output from the loudspeaker 81 beyond a sum of the background noise level and a margin C (step 6). The inserted loss $L_r$ decided in this manner will be represented by $L_{ro}$ (step 7).

After the above-described procedure, the operation advances to the measurement of an acoustic coupling loss $\alpha$. The acoustic coupling loss $\alpha$ is produced as described by the Eq. (2). Meanwhile, the input power $P_s$ of the loudspeaker 81 and the output power $P_m$ of the microphone 71 are expressed as:

$$P_s = E_r - L_{ro} + G_s \text{(dB)} \tag{3}$$

$$P_m = E_t - G_m \text{(dB)} \tag{4}$$

where $E_t$ and $E_r$ respectively are transmitted signal level data and received signal level data which are individually fetched from the rectifiers 1t and 1r into the computer section 91 via the multiplexer 65 and A/D converter 66. The selected insertion loss $L_{ro}$ is the previously determined loss of the receive variable loss circuit, $G_s$ is the gain of the speaker amplifier 82, and $G_m$ is the gain of the microphone amplifier 72. Therefore, the acoustic coupling loss $\alpha$ is produced as follows:

$$\begin{aligned}\alpha &= P_s - P_m \\ &= (E_r - L_r + G_s) - (E_t - G_m) \\ &= (E_r - E_t - L_{ro}) + (G_s + G_m) \text{ (dB)}\end{aligned} \tag{5}$$

In the above equation, $(G_s+G_m)$ is a known value which may be preselected in the designing stage, while the transmitted signal level data $E_t$ and received signal level data $E_r$ may be measured as outputs of the rectifiers 1t and 14. The selected insertion loss $L_{ro}$ is a value stored in the previous step 7 and controlled by the control circuit 90 so that an acoustic coupling loss $\alpha$ is computed and then written into the RAM 92 (step 8).

The measurement of a reverberation time will be described hereinafter. The computer section 91 controls the receive variable loss circuit 83 to insert the maximum loss therein to interrupt the in-band noise coming from the loudspeaker (step 10). From this instant, the measurement of a transmitted signal level $E_t$ is started (step 13). The time period for the transmitted signal level to become attenuated by, for example, 20 dB is counted by a counter of the computer section in terms of a count k(t) of a unit time $t_0$ which is predetermined by the computer section 91. The resulting reverberation time data is written into the RAM 92 (step 11 to 15). Less than a 5 msec unit time is preferable to measure the reverberation time with sufficient precision.

Figure 4:
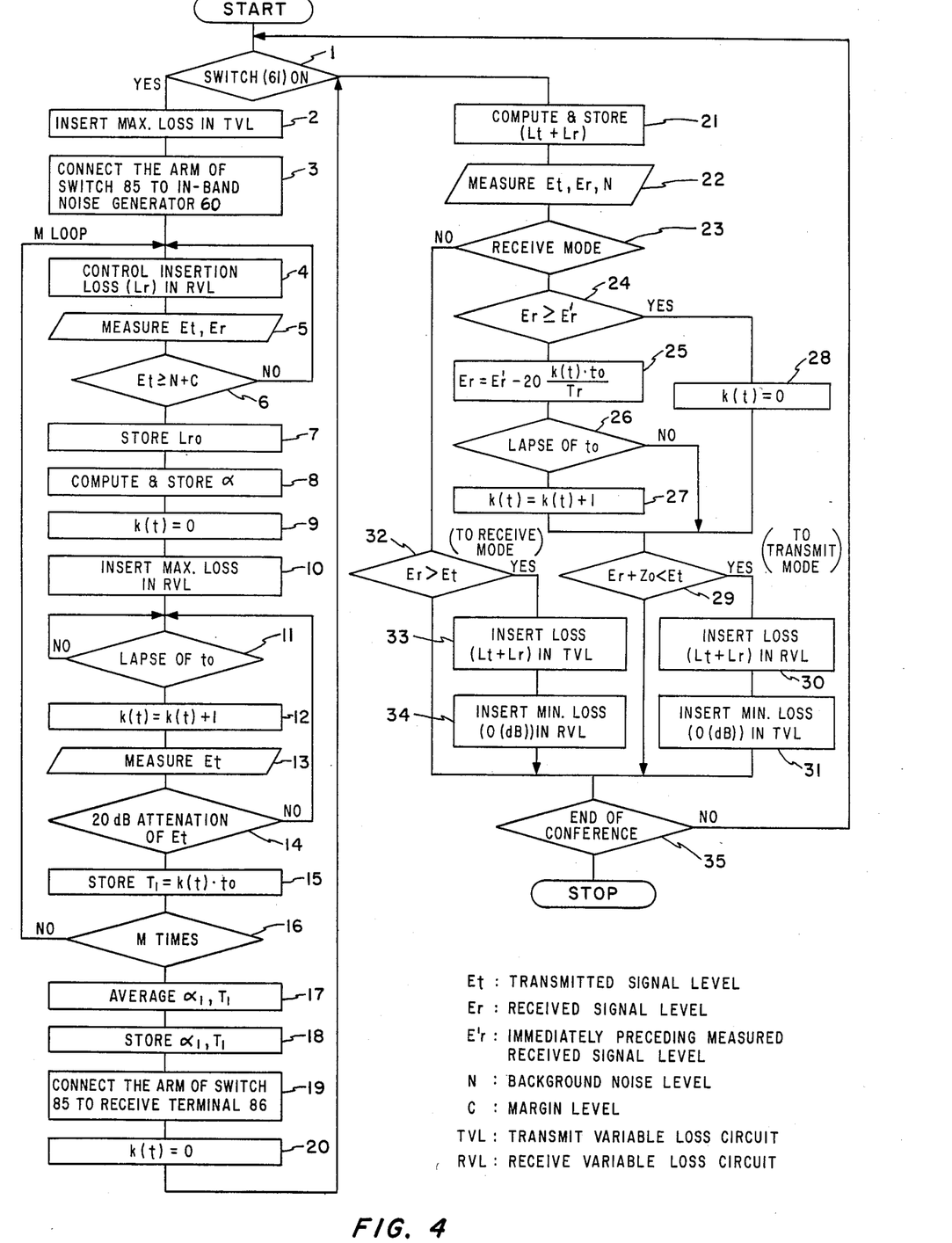
FIG. 4 is a flow chart demonstrating the operation of the first embodiment of the present invention.

The above operation (steps 4 to 15) is repeated a predetermined number of times (step 16). The computer section 91 produces an average value of the resulting data and stores it again in the RAM 92 as the final acoustic coupling loss α and reverberation time data $T_1$ (steps 17 to 18).

Figure 2A:
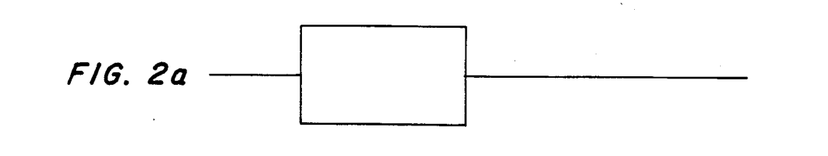
FIG. 2a is a waveform diagram indicative of an in-band noise signal which is applied to a loudspeaker in an embodiment of the present invention.
Figure 2B:
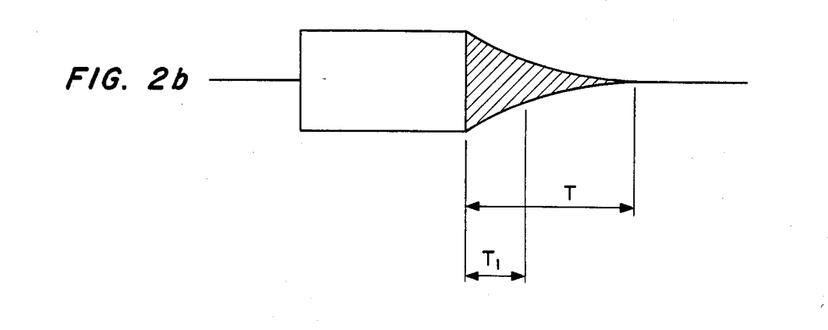
FIG. 2b is a waveform diagram indicative of an in-band noise signal which is produced from a loudspeaker and then collected by a microphone.

The measurement of a reverberation time will be described in more detail. FIG. 2a shows a waveform of an in-band noise signal which is applied to a loudspeaker in accordance with one embodiment of the present invention. FIG. 2b shows a waveform of a signal amplified by a loudspeaker and picked up by a microphone which is effected by a room echo. In these drawings, the abscissa indicates time and the ordinate, signal amplitude. The hatched portion represents an echo signal and shows that an echo signal is picked up by a microphone due to reverberation in a room, immediately after an in-band noise signal to a louspeaker is interrupted. The letter T indicates a time period from the instant of interruption of the in-band noise signal to the loudspeaker to the instant of the attenuation of the signal level by 60 dB, while $T_1$ indicates a time period for the attenuation by 20 dB to occur.

In an ordinary conference room, about 30–60 phons of background noise exists which makes it difficult to measure on original reverberation time T in consideration of the S/N ratio between in-band noise and background noise. A voice switching circuit has a threshold value which is set lower than the average signal level by about 20 dB in order to prevent initial consonants of a speech from being interrupted. For these two reasons, the apparatus in accordance with this embodiment employes the time $T_1$ shown in FIG. 2b as a reverberation time.

Usually, energy once radiated is progressively attenuated while being absorbed by the walls and the like inside a room, and hence, attenuated energy E is expressed as:

$$E = E_c e^{-(2.303 \times 2)t/T_1} \quad (6)$$

wherein $E_c$ is the radiated energy. As seen from the Eq. (6), the echo characteristic of a room is found by measuring a reverberation time $T_1$.

Therefore, the reverberation time $T_1$ will be measured a plurality of times as discussed, and the time $T_1$ will be memorized as an average value.

In the manner described above, an acoustic coupling loss α and a reverberation time $T_1$ are provided by computation and stored in the control circuit 90 to complete the measurement.

Figure 3A:
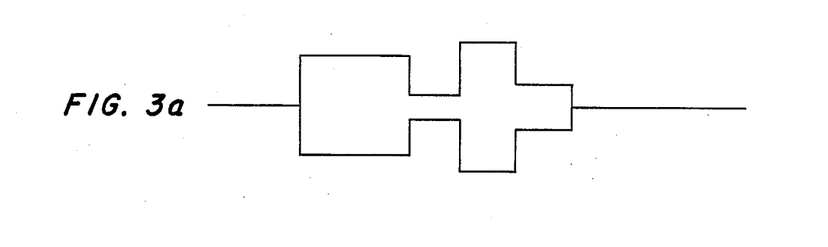
FIG. 3a is a waveform diagram representing a speech signal applied to a terminal 86.
Figure 3B:
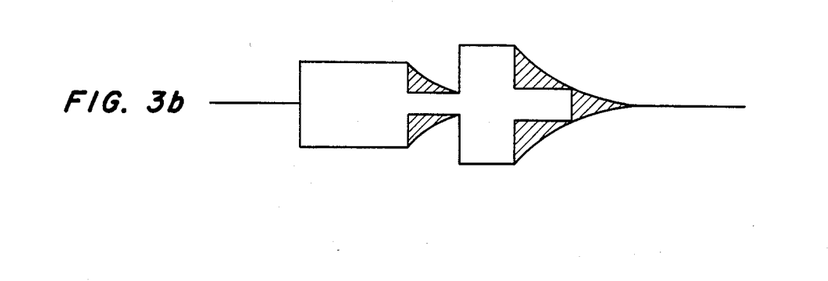
FIG. 3b is a waveform diagram representing the speech signal of FIG. 3a which is collected by a microphone after being radiated from the speaker.
Figure 3C:
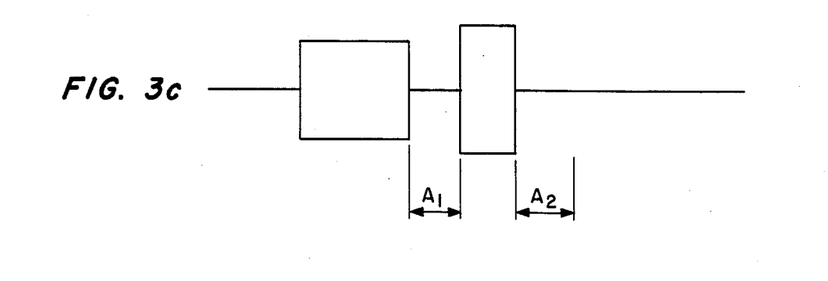
FIG. 3c is a waveform diagram illustrative of received speech blocking which would occur if without the considerations particular of the present invention.

Assume that a voice switching circuit is simply constructed to time-serially compare levels in he receiving condition at an electrical speed, without taking into account the echo in a room. Then, the switching circuit will malfunction to insert a loss in the receive variable loss circuit 84 and a minimum loss in the transmit variable loss circuit 73, resulting in received speech blocking. That is, the signal is interrupted in a portion where the received voice level is low, as shown in FIG. 3c. In FIG. 3c, $A_1$ and $A_2$ indicate portions where the received voice level is low, that is, the signal from a loudspeaker is lost.

As soon as the data are completely written into the RAM 92 (FIG. 1), the computer section 91 controls the switching circuit 85 to connect the receive path amplifier 84 to the receive line terminal 86 (step 19) thereby setting up the usual losses in the variable loss circuits 73 and 83, as will be described later. Under this condition, conversations may be held through the telephone line in the usual hands-free mode. At this instant, the computer section 91 refers to the acoustic coupling loss data stored in he RAM 92 to produce an inserted loss $(L_t + L_r)$ of the variable loss circuits 73 and 83 under the condition which satisfies the Eq. (1) (entailing no howling). The computer section 91 stores the insertion loss (step 21).

Next, a description will be made of a second major function of the apparatus in accordance with the present invention, i.e., level comparison and computation control performed by the control circuit 90 while conversations are under way. The rectifiers 1t and 1r respectively detect an envelope of a speech signal picked up by the microphone 71 and another envelope of a received speech signal. Ther esulting DC signals are applied to the multiplexer 65 which is controlled by the computer section 91 to select the signals. The output of the multiplexer 65 is converted by the A/D converter 66 into a digital signal (step 22). The computer section 91 performs a time-serial comparison and computation processing on the basis of the digital signal data output from the A/D converter 66 and the data of reverberation time $T_1$ (steps 23 to 28). That is, he processing is performed to prevent the erroneous operation of the control circuit 90, which should set up a receiving condition in which a loss is removed from a receive path and a loss is inserted in a transmit path by a received speech signal. The error might otherwise result from an inversion from the receiving condition to the transmitting condition in response to its own received signal through acoustic coupling.

Such a procedure will be described with reference to FIG. 3, in which the abscissa indicates time and the ordinate, signal amplitude. When a speech signal shown in FIG. 3a is received, time-serially at the receive line terminal 86 (FIG. 1), it is amplified by the loudspeaker 81 and then picked up by the microphone 71, in the same room. The microphone 71 develops an output as shown in FIG. 3b. In the waveform of FIG. 3b, the hatched areas shown that even though the received signal applied to the loudspeaker 71 may decrease at the speed of the electrical system, the echo does not diminish in a one-to-one correspondence with the electrical system due to the echo in the room and diminishes in dependence upon the reverberation time in the room.

In accordance with the embodiment of the present invention, received speech blocking is prevented by allowing the first changeover from a receiving condition to a transmitting condition to occur only when the difference between the transmitted signal level $E_t$ and the receive signal level $E_r$ has exceeded a reference level $Z_0$ (steps 29 to 31, 35). Then, the computer section controls the variable loss circuits 73 and 83 to make the losses equal to $(L_t + L_r)$ and 0, respectively (steps 30, 31). Meanwhile, the control provided by the computer section maintains a receiving condition as long as the received signal level is higher than the transmitted signal level (steps 29 to 35).

The reference level $Z_0$ is pedetermined as follows. A level difference Z between received and transmitted signal levels is produced from the Eq. (5) as:

$$\begin{aligned}Z &= E_r - E_t \\ &= (\alpha + L_r) - (G_r + G_t) \text{ (dB)}\end{aligned} \quad (7)$$

The minimum value, $Z_{min}$, of the level difference Z develops under a receiving condition $L_r=0$ and is therefore obtained from the Eq. (7) as:

$$Z_{min} = \alpha - (G_r + G_t) \text{ (dB)} \qquad (8)$$

Thus, the minimum level difference $Z_{min}$ is set at $Z_0$ so that a receiving condition is prevented from being switched to a transmitting condition unless a difference between the transmitted signal level $E_t$ and the received signal level $E_r$ increases beyond the reference level $Z_0$, thereby identifying a receive mode so long as $E_r > E_t$ holds (steps 29, 35).

The reference level $Z_0$ is determined by an acoustic coupling loss $\alpha$ and a gain of the amplifier by the Eq. (8) and, therefore, a quantity determined by a place for installation by the equation (8).

Furthermore, in accordance with the present invention, received speech blocking due to reverberation is eliminated. An arrangement is employed which, when a received signal level $E_r$ is higher than the immediately preceding received signal level $E'_r$, uses the latter signal level $E_r$ for comparison with a transmitted signal level. When the current received signal level $E_r$ is lower than the immediately preceding one $E'_r$, the arrangement uses a signal which is the preceding signal level $E'_r$ that diminishes with the previously measured time constant $T_1$. Stated another way, a delay control is performed responsive to the reverberation time data $T_1$ stored in the RAM 92. The RAM makes a changing digital signal which varies with time, which is analogous to the waveform in which voice amplified by the loudspeaker 81 is attenuated echoing in a room. That is, the computer section 92 provides the received signal level $E_r$ (step 25) as data for making a level comparison when the received signal level data $E_r$ is lower than the immediately preceding received signal level $E'_r$. The change is described by the following equation:

$$E_r = E'_r - 20 \times \frac{k(t) \cdot t_o}{T_1} \qquad (9)$$

The equation (9) produces $E_r = E'_r$ when the initial value is $k(t) \cdot t_o = 0$, and $E_r = E'_r - 20$ (dB) when $k(t) \cdot t_o = T_1$. New received signal level data $E_r$ is compared at every measurement with the data $E_r$ predetermined by the equation (9). That is, the count k(t) is incremented one by one to $T_1/t_o$, as long as the new received signal level is smaller than the data $E_r$ determined by the equation (9) (through a loop of steps 24, 25, 26, 27, 29, 30, 35, 1, 21, 22, 23 and 24). When the new signal is found to be higher than the stored signal, the above processing is cleared (step 28) and the subsequent processing is performed, based on the new received signal level data.

When the apparatus is in a transmit mode in step 23, steps 32, 35 or 32–35 follow. That is, when a received signal level is higher than a transmitted signal level, the mode is changed over to a receve mode to put in the variable loss circuits 73 and 83 the losses equal to $(L_t + L_r)$ and 0, respectively (steps 32–35). If the situation is opposite, the transmit mode is held (steps 32, 35).

Although, in the illustrative embodiment of the resent invention, a level processing is applied to a received signal level in consideration of a reverberation time, it will be apparent to those skilled in the art that a similar processing is applicable to a transmitted signal level, in which case the new received signal level $E_r$ in each equation will be replaced by $E_t$ and the initial value of $k(t) \cdot t_o$ will be make $k(t) \cdot t_o = T_1$. Sequential processing will be proceeded by decreasing k(t).

In other words, when the present transmitted signal level is lower than the immediately preceding transmitted signal level, a signal which increases from the immediately preceding level $E_t$ minus 20 (dB) in accordance with the reverberation time $T_1$ is used for comparison with a received signal level.

Figure 5:
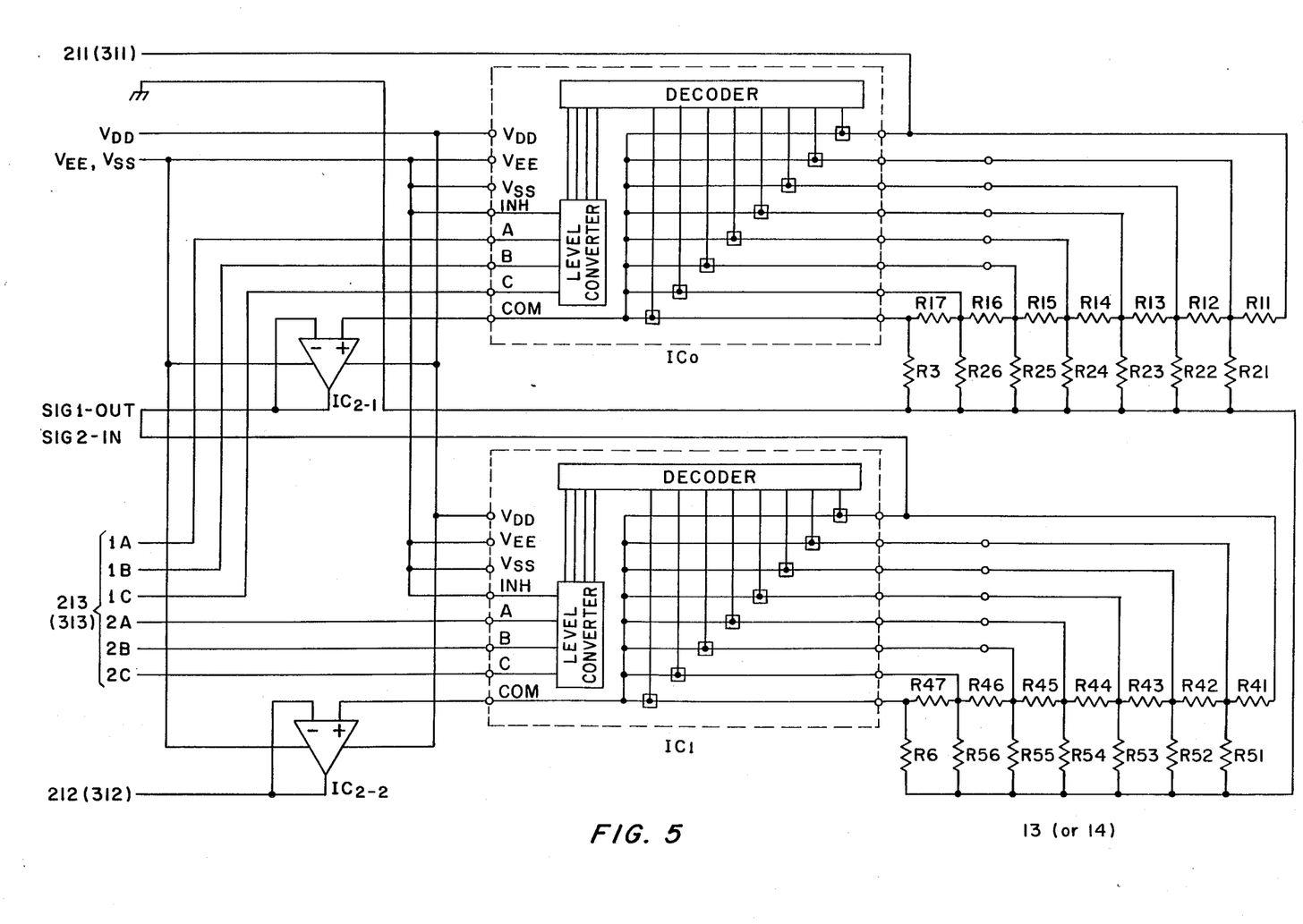
FIG. 5 is a diagram of a digital control type variable loss circuit applicable to the present invention.

FIG. 5 shows a digital control type viable loss circuit applicable to the illustrative embodiment. As shown, a control bus 213 (or 313) has digital control input terminals 1A, 1B, 1C, 2A, 2B and 2C. When digital control signals are applied to these input terminals, a speech signal which arrives at a line 211 (or 311) selects output taps of a resistor ladder network at $IC_0$ whereby a 1-dB step loss control is performed. The output appears at a terminal SIG1-OUT. The SIG1-OUT signal is routed to a SIG2-IN terminal and, again, selects taps of the register ladder network from $IC_1$ with the result that an 8-dB step loss control is effected to deliver an output to a line 212 (or 313).

Figure 6:
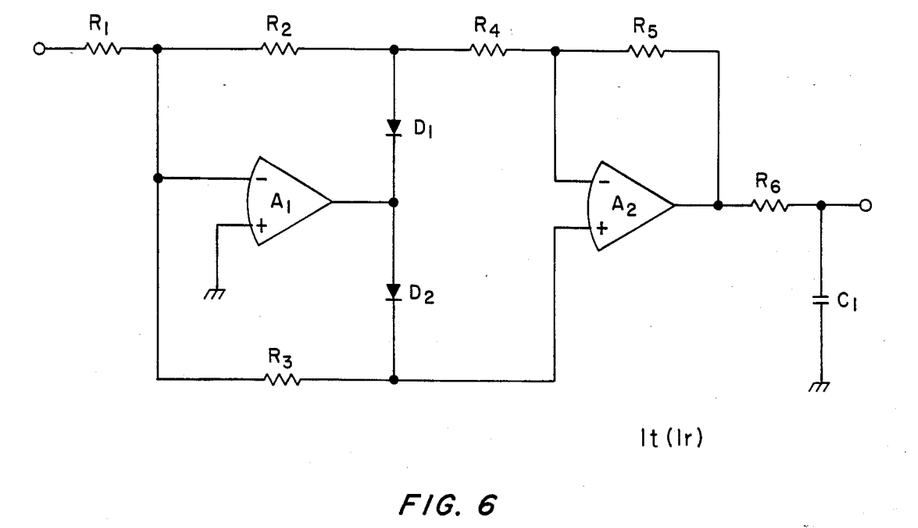
FIG. 6 is a diagram of an envelope detection type rectifier circuit adapted to detect received speed signals or transmitted speed signals.

FIG. 6 shows the rectifier 1t (1r) for envelop detection, which is used fro the received signal detection and transmitted signal detection in FIG. 1. The illustrated type of circuitry is well known in the art and, therefore, details thereof will not be described for simplicity.

Figure 7:
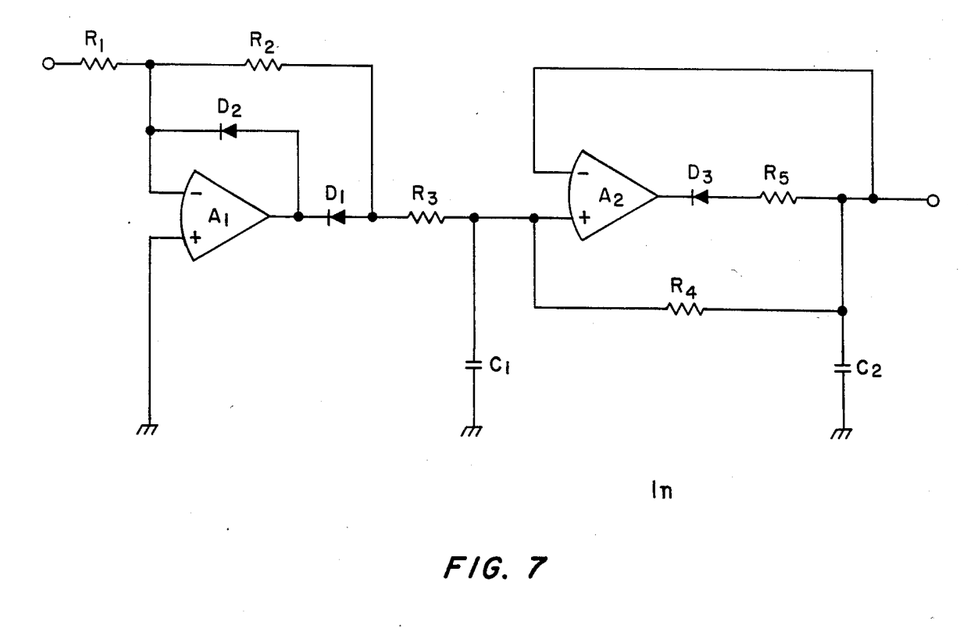
FIG. 7 is a diagram of a noise detection circuit for detecting a noise level in a room.

Shown in FIG. 7 is the detector 1n responsive to a room noise level. In order to discriminate between background noise and voice signals, the detector 1n has a sufficiently large charging time constant $R_4C_2$ and a small discharging constant $R_5C_2$, thereby removing from speech signals, and the like, those level fluctuations which are substantial and converting only background noise levels into DC signals.

Figure 8:
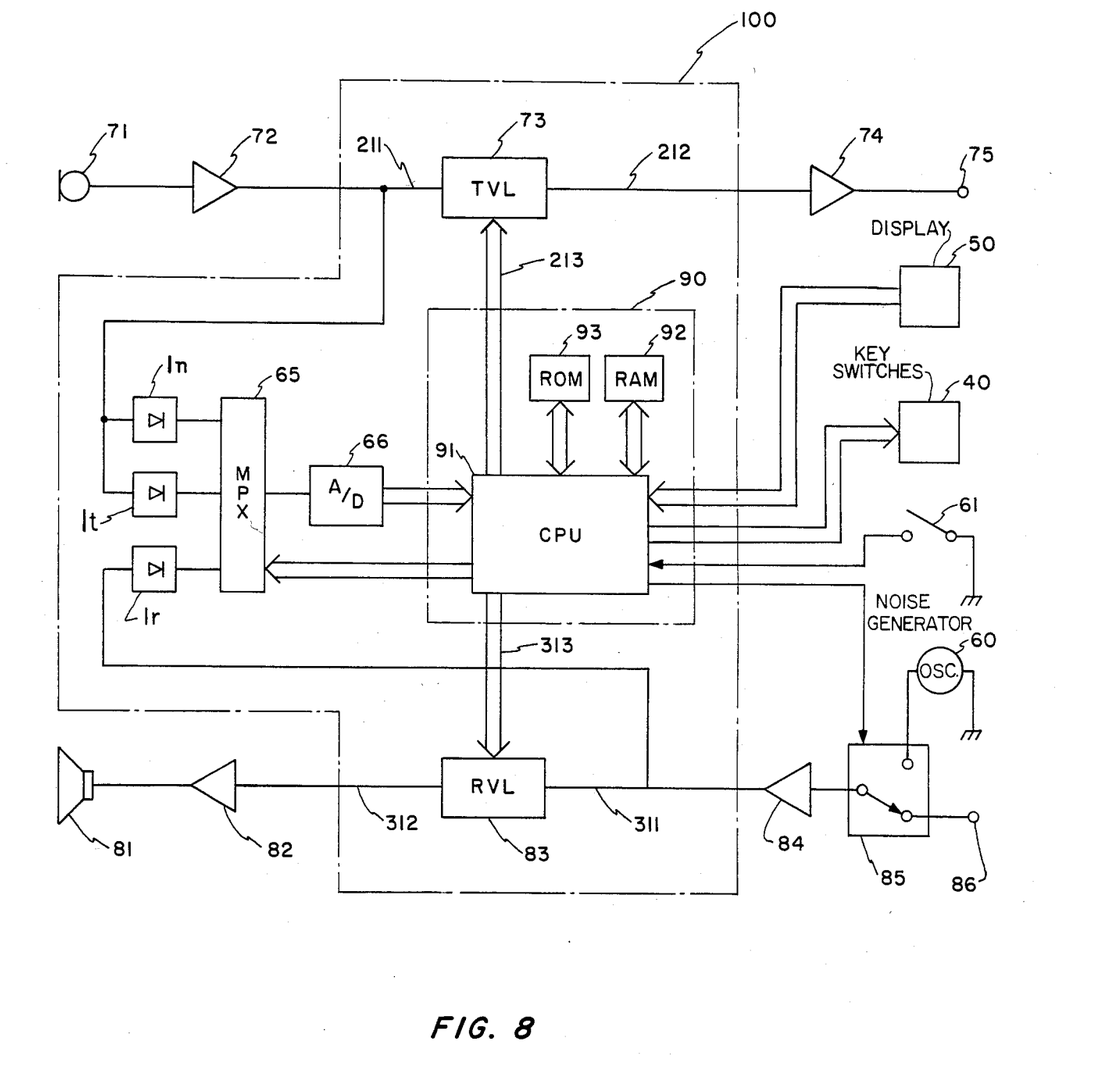
FIG. 8 is a block diagram of a second embodiment of the present invention.

In the second embodiment of the present invention shown in FIG. 8, the apparatus additionally includes a display 40 which is operated responsive to an acoustic coupling loss and a reverberation time constant. A set of key switches 50 set the insertion losses. The reset of the construction is identical with that of FIG. 1 and, therefore, the same reference numerals are employed for designation.

In the first embodiment, the apparatus automatically regains the usual communication condition after the measurement of an acoustic coupling loss and a reverberation time. Then, it automatically performs a computation control based on the data. In the second embodiment, after the measurement of the data, the data are displayed by the display 40 so that one may manipulate the switches 50 while observing the displayed data to select insertion losses. Describing the control with reference to FIG. 4, the acoustic coupling loss $\alpha$ and reverberation time $T_1$ are indicated on the display 40 after the computation. The switches 50 are manipulated to set $\alpha$ and $T_1$ based on the computed data. Then they are stored in the computer section 92, followed by substantially the same steps as those of the first embodiment. The second embodiment allows data once measured to be entered again by means of the key switches 50. Therefore, in the event of a power failure, it is needless to measure $\alpha$ and T all over again and the apparatus is usable for conversations from the start.

While in the foregoing embodiments description has concentrated to a conference room furnished with a single loudspeaker and a single microphone, a conference room may be equipped with one or two loudspeakers and from several to twelve micrpohones. In such a case, each of the microphones, is connected to the input line 211 of the variable loss circuit via its associated microphone amplifier. The loudspeakers are connected in parallel to the speaker amplifier 82.

In summary, it will be seen that the present invention provides a conference telephone apparatus which eliminates howling or received voie blocking regardless of the acoustic conditions in which the apparatus is installed and, at the same time, realizes changeover between transmission and reception and speech exchangeability which are optimim for any specific conditions of a conference room.

Those who are skilled in the art will readily perceive how to modify the invention. Therefore, the appended claims are to be construed to cover all equivalent structures which fall within the true scope and spirit of the invention.

What is claimed is:

1. A conference telephone apparatus comprising:
 a transmit communication path means including a microphone and a first variable loss circuit which applies a loss to a transmitted signal output from said microphone;
 a receive communication path means including a second variable loss circuit for applying a loss to a received signal, and a loudspeaker for converting an electric signal into a voice signal, said electric signal being supplied via said second variable loss circuit;
 transmitted signal level dectector means for detecting an envelope of the transmitted signal;
 received signal level detector means for detecting an envelope of the received signal;
 means for generating a noise signal which extends over a speech band;
 means for connecting the noise signal generating means to the receive communication path means when it is being activated;
 means for setting the second variable loss circuit to a first loss level so that a noise signal level picked up by the microphone becomes sufficiently higher than a background noise level;
 means for measuring a signal caused by an acoustic coupling loss which is indicative of the application of an electric input signal to the speaker and an electric output signal from the microphone, said measuring means processing an output level of the transmitted signal level detector means which is indicative of a level of the noise signal which is emitted from the loudspeaker responsive to signals received via the receive communication path, the output level of the received signal level detector means being indicative of the noise signal, and the first loss;
 means for measuring the reverberation time by monitoring an echo level picked-up by the microphone from an instant when the noise signal from the noise signal generator is interrupted by inserting a maximum insertion loss into the second variable loss circuit;
 means for predetermining a sum of insertion losses of the first and second variable loss circuits which prevents howling from the acoustic coupling loss; and
 means for controlling the first and second variable loss circuits such that, after the connecting means is deactivated, one of the transmit and receive communication paths has a first gain which is sufficiently high to enable a hands-free telephone conference and the other of the paths has a gain smaller than the first gain in response to a difference between a received signal level and a transmitted signal level.

2. A conference telephone apparatus as claimed in claim 1, wherein means in the control means changes over the first gains of the transmit and receive communication paths only when the difference between the received and transmitted signal levels increases beyond a predetermined reference level.

3. A conference telephone apparatus as claimed in claim 1, and means responsive to a current received signal level which is lower than an immediately preceding received signal level for using said immediately preceding receive signal level to control the attenuation in the reverberation time.

4. A conference telephone apparatus as claimed in claim 2, and means responsive to a current transmitted signal level which is lower than an immediately preceding transmitted signal level for using a signal increasing with a factor determined by the reverberation time as measured from a signal level which is a predetermined level lower than said immediately preceding transmitted signal level.

5. A circuit for preventing howling responsive to an acoustical coupling feedback between a microphone and loudspeaker in the same general area; said circuit comprising first and second voice signal transmission paths leading from a microphone and extending to a loudspeaker, respectively; variable signal loss control means in each of said paths for controlling the signal level therein; means for setting said variable loss control means to produce predetermined signal levels which are higher in one path and lower in the other path; means for periodically measuring levels of signals caused by acoustic coupling and reverberation timing in the area of said microphone and loudspeaker; computer means responsive to a computation based upon said measured levels, said signals caused by acoustic coupling and the reverberation time for controlling said variable signal loss control means responsive to the levels of signals in said two paths, means for comparing the levels of signals in said first and second paths, and means responsive to said comparing means for changing said setting when the difference between the compared levels exceeds a predetermined reference level.

6. The circuit of claim 5 and manually operated means for intermittently generating a noise signal in said second transmission path extending to said loudspeaker, said noise signal generally covering the frequency range of a voice signal transmitted through said path, and means wherein said computer means computes a signal for said control of said variable loss responsive to the output of said microphone during a loudspeaker response to said noise signal.

7. The circuit of claim 6 and means wherein said reverberation time is computed responsive to an echo signal picked-up by said microphone at the end of said intermittent noise signal for storing a memory of said signal computed from the acoustic coupling and reverberation time on each periodic measurement thereof, and means responsive to a comparison between the present and immediately preceding measurement for adjusting the variable losses.

8. The circuit of claim 7 and means for adding a pseudoecho signal which is expotentially attenuated to a received signal in said second path for minimizing signal differences in said first and second paths.

9. The circuit of claim 6 and means for detecting room noise in said general area during normal conversation, analog-to-digital converter means for converting said room noise into digital signals, means for applying said digital signal to said computer means, means for comparing the signal-to-noise ratio of said room noise and said noise signal, and a read only memory means for storing a program for controlling said variable loss control means to minimize the signal-to-noise ratios found by said comparing means.

10. The circuit of claim 5 and means for holding said first and second paths in a receiving condition as long as the level of the signal in said second path is higher than the level of the signal in the first path.

11. The circuit of claim 5 and means for detecting room noise in said general area, analog-to-digital converter means for converting said room noise into digital signals, means for applying said digital signal to said computer means, and a read only memory means for storing a program for controlling said variable loss control means responsive to said digital signals.

12. The circuit of claim 11 and means for operating said room noise detector means during conversation.

13. The circuit of claim 5 and means for comparing the envelopes of electrical signals received by said loudspeaker and the signals picked-up by said microphone, and means in said computer means for making a time serial comparison of the compared signals to detect said reverberation time.

14. The circuit of claim 13 and means for holding said first and second paths in a receiving condition as long as the level of the signal in said second path is higher than the level of the signal in the first path.

15. A method for preventing howling in a circuit having an acoustical coupling feedback between a microphone and loudspeaker in the same general area, said method comprising the steps of:
 (a) transmitting voice signals through first and second transmission paths leading from a microphone and extending to a loudspeaker, respectively;
 (b) controlling a variable signal loss control means in each of said paths for adjusting the signal level therein;
 (c) setting said variable loss control means to produce predetermined signal levels which are higher in one path and lower in the other path;
 (d) periodically measuring a signal caused by acoustic coupling and reverberation timing in the area of said microphone and loudspeaker;
 (e) comparing the levels of signals in said first and second paths; and
 (f) computing a signal for controlling said variable signal loss based upon said measured signal caused by acoustic coupling and reverberation time for adjusting the control of step (b) responsive to the levels of signals in said two paths and for changing the adjustment of said control when the difference between the compared levels exceeds a predetermined reference level.

* * * * *